United States Patent [19]

Elliott

[11] 4,054,295
[45] Oct. 18, 1977

[54] VEHICLE BODY SUPPORT AND LEVELER DEVICE

[75] Inventor: James O. Elliott, Xenia, Ohio

[73] Assignee: General Motors Corporation, Detroit, Mich.

[21] Appl. No.: 714,587

[22] Filed: Aug. 16, 1976

[51] Int. Cl.² .................................. B60G 11/26
[52] U.S. Cl. ........................ 280/6.1; 200/84 C; 267/65 D; 280/707
[58] Field of Search ............... 280/6 H, 6.1, 707, 702; 267/65 D; 104/148 MS; 200/84 C

[56] References Cited

U.S. PATENT DOCUMENTS

| | | | |
|---|---|---|---|
| 3,200,645 | 8/1965 | Levins | 200/84 C |
| 3,678,750 | 7/1972 | Dinoia | 200/84 C |
| 3,685,357 | 8/1972 | Alexander | 200/84 C |
| 3,727,941 | 4/1973 | Ciolli | 280/707 |
| 3,830,138 | 8/1974 | Joneleit | 280/707 |
| 3,941,402 | 3/1976 | Yankowski | 280/688 |

Primary Examiner—Joseph F. Peters, Jr.
Assistant Examiner—John A. Carroll
Attorney, Agent, or Firm—Robert M. Sigler

[57] ABSTRACT

An auxiliary vehicle body support and leveler device of the type commonly known as a load leveling shock absorber includes a non-magnetic cover fixed to the vehicle body, a pair of magnetic strips vertically aligned and separated on the outer surface of the cover and a pair of magnetic reed switches, one associated with each magnetic strip, the reed switches being horizontally disposed with one reed adjacent the respective magnetic strip so that the reed switch closes in respond to the presence of a magnetic pole anywhere along the strip. The device also includes a main body fixed to the vehicle running gear and defining a variable volume chamber with the cover, the main body having mounted thereon, within the cover, a permanent magnet disposed with one pole adjacent the magnetic strips and adapted to move vertically between the strips as the main body and cover move relative to one another. The reed switches actuate a mechanism to control the movement of pressurized fluid in and out of the variable volume chamber to maintain the vehicle body at a substantially constant height.

1 Claim, 3 Drawing Figures

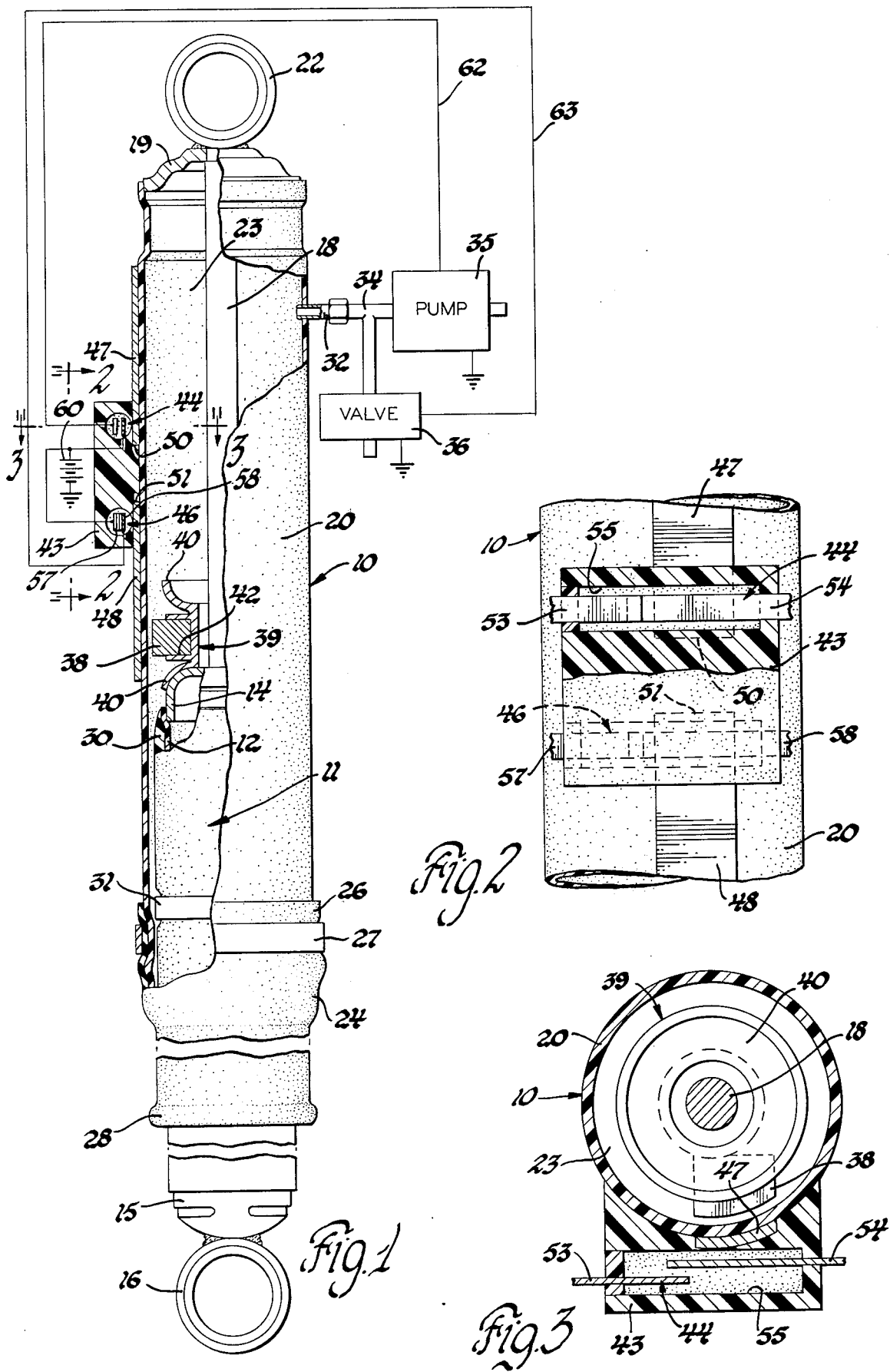

VEHICLE BODY SUPPORT AND LEVELER DEVICE

SUMMARY OF THE INVENTION

This invention relates to an auxiliary vehicle body support and leveler device of the type commonly known as a load-leveling shock absorber. Such devices comprise two relatively movable parts, one fixed to the vehicle body and the other fixed to the vehicle running gear, and a variable volume chamber therebetween, to which pressurized fluid can be added to raise the vehicle body with respect to the running gear or drained to lower the vehicle body with respect to the running gear.

This invention relates particularly to such devices having means for sensing whether the vehicle body is above or below a predetermined optimum height with respect to the running gear and automatically controlling the actuation of fluid pump and drain means to maintain said optimum height.

Height control sensing means are well known, particularly in the liquid level control field, which use a vertically movable permanent magnet to close appropriate magnetic reed switches to actuate appropriate pumps and valves. However, to the best knowledge of the inventor, magnets and reed switches have never been successfully applied to vehicle load support systems.

A particular problem with magnets and magnetic reed switches has to do with magnet overtravel. The magnetic reed switch is actuated only when the magnet is very near it. But, in the case of a vehicle load support system, if a particular pump is to be actuated when a magnet moves upward adjacent a reed switch, the pump should still be actuated if the magnet continues to move upward well past the reed switch. However, as the magnet moves upward away from the reed switch, its effect on the reed switch diminishes and, in the absence of further reed switches or an electronic holding circuit of some sort, the pump will become deactivated at the time when it is needed most. The same applies to a valve actuated by a second reed switch below the first as the magnet moves downward well past that second reed switch. The multiple reed switches and electronic holding circuits shown in the prior art in fluid level control systems, even if applicable to a vehicle load support system, are too expensive or too fragile to be practical.

This invention, however, proposes a vertically moving magnet in a vehicle load support device, a pair of magnetic reed switches attached to the vehicle load support device for controlling a pump in a valve to admit and release pressurized fluid from the vehicle load support device, and inexpensive, rugged magnet overtravel holding means for the reed switches comprising a pair of magnetic strips attached to the vehicle load support device and disposed in a particular manner with relation to the magnetic reed switches to serve as conductors of magnetic flux between the magnet and one reed of the appropriate magnetic reed switch when the magnet has moved beyond it. These elements are shown connected together to comprise an automatic vehicle support and level maintaining system for a land vehicle.

Further details and advantages of this invention will be apparent from the accompanying drawings and following description of a preferred embodiment.

SUMMARY OF THE DRAWINGS

FIG. 1 shows a partially cutaway and partially schematic view of a preferred embodiment of this invention.

FIG. 2 shows a view along line 2—2 in FIG. 1.

FIG. 3 shows a section view along line 3—3 in FIG. 1.

DESCRIPTION OF A PREFERRED EMBODIMENT

Referring to FIG. 1, a vehicle body support and leveling device is generally indicated at 10. Device 10 is adapted to be connected between the sprung and unsprung mass of a land vehicle and serve as an auxiliary spring to supplement the load carrying capacity of a primary spring which supports the sprung mass on the unsprung mass. Device 10 comprises, in general, any arrangement wherein a movable abutment such as part of a shock absorber is telescoped with respect to a second cylindrical member that forms a variable volume chamber into which fluid is directed for maintaining the desired height relationship between a vehicle connected to opposite end mounts of the leveler.

More particularly, in this embodiment device 10 includes, as a main body, a double, direct acting hydraulic shock absorber 11 having an outer cylindrical member 12 which is connected at the upper end thereof to an end closure 14 and at the bottom end thereof to an end closure 15.

End closure 15 is welded to means such as a connecting ring 16 adapted to be connected to the unsprung mass of a vehicle, for example to means on the housing of the rear axle assembly of a vehicle at one side thereof.

An elongated piston rod 18 is directed from the shock absorber 11 through the end closure 14 thereof and in FIG. 1 is shown in an extended position. The end of piston rod 18 is connected to a cap 19 that closes the upper open end of an outer cylindrical dust shield member 20 to form a cover for the main body 12. In addition, the end of rod 18 is connected to means such as a mounting ring 22 adapted to be connected to the sprung portion of a vehicle such as a bracket on the chassis frame.

The opposite end of the outer cylindrical member 20 is located in telescoping relationship with the outer surface of the cylindrical member 12 to define a variable volume chamber 23 therebetween which has a reduced volume as the piston rod 18 enters the shock absorber 11 and has an increased volume when piston rod 18 is extended outwardly of shock absorber 11 as shown in FIG. 1.

Variable volume chamber 23 is sealed by a flexible sleeve member 24 which has an outer end 26 thereon sealingly connected to the lower end of the outer cylindrical member 20 by a clamp ring 27. Sleeve member 24 is rolled inwardly at 28 and is arranged in overlying relationship with the outer surface of member 12 of the shock absorber 11.

The inside end 30 of sleeve 24 is located in close proximity to end closure 14 and a clamp ring 31 is secured to the end 30 at a point spaced downwardly on cylindrical member 12 as shown in FIG. 1 for securing the sleeve 24 to the cylindrical member 12.

Sleeve 24 allows relative movement between shock absorber 11 and the outer cylindrical member 20 in response to road produced movements between the unsprung mass and the sprung mass of the vehicle and in response to changes in vehicle load while maintaining a fluid seal between the outer cylindrical member 20 and shock absorber 11 for sealing the variable volume chamber 23.

Device 10 includes an inlet-outlet fitting 32 connected through the outer cylindrical member 20. A conduit 34 connects fitting 32 to a source of pressurized fluid such as pump 35 for directing fluid into variable volume chamber 23 and a valve 36 for allowing the escape of fluid from variable volume chamber 23.

For a given height of the vehicle body or sprung mass above the vehicle running gear or unsprung mass, device 10 assumes a position with mounting rings 16 and 22 a particular distance apart and variable volume chamber 23 defining a particular volume. If an additional load is added to the vehicle, which results in mounting rings 16 and 22 moving closer together, this invention provides means to sense such movement and actuate pump 35 to expand variable volume chamber 23 and return device 10 to its preselected length. Likewise, if the load of the vehicle is lightened so that the distance between mounting rings 16 and 22 is increased, this invention provides means for actuating the valve 36 so that device 10 can return to its preselected length.

In accordance with this invention, a permanent magnet 38 is mounted in a magnet holder 39 which is fixed to end closure 14 of shock absorber 11. Holder 39 can be made from an inexpensive nonmagnetic plastic material and is shown in FIG. 1 as having a pair of concave axial end cups 40, one of which is adapted to fit over and be attached to end closure 14 and the other of which serves as a stop for upward movement of shock absorber 11 to cap 19, and a central magnet pocket 42 for holding magnet 38.

Permanent magnet 38 is mounted in magnet pocket 42 with its poles radially disposed with respect to piston rod 18, one of the poles being directly adjacent outer cylindrical dust shield member 20. As shock absorber 11 moves axially within member 20, magnet 38 traverses an axial path along the inside of member 20.

When the vehicle supported by device 10 is at its desired height, magnet 38 will be disposed adjacent a particular spot on member 20. On the outside of member 20 at this spot is disposed a case 43 containing an upper reed switch 44 and a lower reed switch 46. Upper reed switch 44 is disposed above the aforementioned particular spot on member 20, while lower reed switch 46 is disposed below the spot.

In addition, an upper magnetic strip 47 and a lower magnetic strip 48 are disposed on the outer surface of member 20 along the path traced by magnetic 38. Each of the magnetic strips 47 and 48 comprises a long thin strip of a magnetic material; and the strips are arranged such that upper strip 47 has a lower end 50 adjacent upper reed switch 44 and extends upward therefrom while lower strip 48 has an upper end 51 at lower reed switch 46 and extends downward therefrom. FIGS. 2 and 3 show more details of the alignment of magnetic strips 47 and 48 with reed switches 44 and 46. Upper reed switch 44 comprises a pair of reeds 53 and 54 within a chamber 55, which reeds 53 and 54, when made part of a magnetic flux path, are effective to move into engagement and electrical contact with one another. As shown in FIGS. 2 and 3, magnetic strip 47 is disposed adjacent reed 54, so that a magnetic flux path may be established through reed 53, reed 54 and upper magnetic strip 47 when magnet 38 is adjacent strip 47. Lower reed switch 46 likewise comprises reeds 57 and 58 with lower magnetic strip 48 adjacent reed 58 so that a magnetic flux path may be set up through reed 57, reed 58 and magnetic strip 48 when magnet 38 is adjacent strip 48. Reed switches 44 and 46 and magnetic strips 47 and 48 are spaced vertically far enough apart so that, when magnet 38 is in the aforementioned particular spot corresponding to the desired height of the vehicle supported by device 10, there will be insufficient magnetic flux through either of the magnetic strips and their corresponding reed switches to actuate those reed switches. If magnet 38 moves upward from the particular spot and approaches upper magnetic strip 47, the magnetic flux through upper reed switch 44 increases to the point where reed switch 44 closes. Likewise if magnet 38 moves downward from the particular spot and approaches lower magnetic strip 48, the magnetic flux through lower reed switch 46 will increase to the point where that switch closes. Because of the easy flux paths through the magnetic strips 47 and 48, the appropriate reed switch will remain closed as long as magnet 38 is disposed anywhere along the length of the corresponding magnetic strip.

As shown in FIG. 1, a source of electric power 60 is adapted to be connected through reed switch 44, when closed, and a conductor 62 to actuate pump 35. Likewise power source 60 is adapted to be connected through reed switch 46, when closed, and a conductor 63 to actuate valve 36. Thus, as the vehicle moves downward on device 10 under an increased load and causes magnet 38 to move upward adjacent magnetic strip 47, reed switch 44 is closed to actuate pump 35 and increase the pressure of fluid within variable volume chamber 23 to move the vehicle upward once again. Likewise, if the load of the vehicle is decreased and the vehicle moves upward causing magnet 38 to move downward adjacent magnetic strip 48, reed switch 46 is closed to actuate valve 36 to allow the escape of some fluid from, and a consequent decrease in the pressure of fluid within variable volume chamber 23, thus allowing the vehicle body to move downward. The system including device 10 therefore causes the vehicle body to remain supported at a substantially constant height above the vehicle running gear.

The particular circuit connections showing a flow of current from power source 60 through either of the reed switches and pump 35 or valve 36 to ground are shown for simplicity and clarity. Actually, since magnetic reed switches have a limited current capacity, the current flowing through conductor 62 or conductor 63 would probably constitute a small signal current to actuate further relay or other switch means associated with pump 35 or valve 36 for the actuation thereof.

The embodiment described above is a preferred embodiment only. Other equivalent embodiments will occur to those skilled in the art and therefore this invention should be limited only by the claim which follows.

The embodiments of the invention in which an exclusive property or privilege is claimed are defined as follows 1. In an auxiliary vehicle body support and leveler device of the type including a main body fixed to vehicle running gear and a cover fixed to the body, the cover being made of a non-magnetic material, being vertically movable with respect to the main body and defining with the main body a variable volume chamber having means adapted for communication with a source of high pressure fluid through means to control said communication and a fluid outlet adapted for communication with a low pressure fluid sump through means to control said communication, whereby the pressure of fluid within the chamber and thus the load supporting capacity of the device can be varied, the improvement comprising a pair of vertically oriented, vertically separated strips of magnetic material fixed to the cover;

a pair of magnetically responsive reed switches fixed to the cover, each of the reed switches being associated with a different one of the strips, having a pair of contact reed adapted to close in response to magnetic flux thereacross and being oriented horizontally with one of the reeds adjacent the associated vertical strip, the reed switch adjacent the upper strip being adapted for connection to the high pressure fluid source communication control means for actuation thereof when closed, the reed switch adjacent the lower strip being adapted for connection to the low pressure fluid sump communication control means for actuation thereof when closed;

and a permanent magnet fixed to the main body within the chamber and adjacent the vertical strips, the magnet having poles and being oriented with the poles horizontally juxtaposed, one adjacent the strips and one separated therefrom, the magnet being effective, as the cover reciprocates vertically, to close only the upper reed switch when adjacent the upper strip, only the lower reed switch when adjacent the lower strip and neither reed switch when between strips.

* * * * *